(12) United States Patent
Cheong

(10) Patent No.: US 8,523,351 B1
(45) Date of Patent: Sep. 3, 2013

(54) EYEWEAR WITH INTERCHANGEABLE ATTACHMENT

(76) Inventor: Lak Cheong, Hong Kong (HK)

( * ) Notice: Subject to any disclaimer, the term of this patent is extended or adjusted under 35 U.S.C. 154(b) by 47 days.

(21) Appl. No.: 13/415,875

(22) Filed: Mar. 9, 2012

(51) Int. Cl.
*G02C 3/00* (2006.01)
*A61F 11/00* (2006.01)

(52) U.S. Cl.
USPC ............................ 351/156; 351/123; 128/864

(58) Field of Classification Search
USPC ................. 351/156, 157, 123, 121, 119, 111, 351/41, 158; 128/864; 381/381, 320, 375
See application file for complete search history.

(56) References Cited

U.S. PATENT DOCUMENTS

| | | | | |
|---|---|---|---|---|
| 5,002,381 A * | 3/1991 | Murrell | ........................ | 351/123 |
| 5,488,441 A * | 1/1996 | Pomatti | ........................ | 351/156 |
| 5,781,272 A | 7/1998 | Bright | | |
| 6,382,213 B1 * | 5/2002 | Sanpei | ........................ | 128/864 |
| 7,059,717 B2 * | 6/2006 | Bloch | ........................ | 351/119 |
| 7,419,260 B1 | 9/2008 | Wang | | |
| 7,641,334 B1 * | 1/2010 | Goldie | ........................ | 351/123 |

FOREIGN PATENT DOCUMENTS

| | | |
|---|---|---|
| CN | 200944165 Y | 9/2007 |
| CN | 201025495 Y | 2/2008 |
| CN | 101788725 A | 7/2010 |
| CN | 201637939 U | 11/2010 |

* cited by examiner

*Primary Examiner* — Hung Dang
(74) *Attorney, Agent, or Firm* — Epstein Drangel LLP; Robert L. Epstein

(57) ABSTRACT

An eyeglass attachment for interchangeably coupling with eyeglasses having at least one lens having an outer peripheral edge, and a frame including a nose bridge and two spaced-apart side ear-stems. The ear-stems are pivotally connected to the outer peripheral edges of the lens and include a distal end having a catch. A pair of removable tips connect to corresponding distal ends of the ear-stem and include a hollow cavity member having a rectangular downwardly facing notch having an abutment surface. The attachment means includes an adjustable strap means integrally coupled between a pair of clip assemblies each including a removable means for connecting with the catch of the ear-stems. The clip assemblies include a fastening means for connecting to the adjustable strap, and a pin for pivoting the removable and fastening means about an axis. The pin includes an earpiece holding means for securing a wire therein.

11 Claims, 3 Drawing Sheets

EYEWEAR WITH INTERCHANGEABLE ATTACHMENT

BACKGROUND OF THE INVENTION

1. Field of the Invention

This invention relates generally to eyewear and more particularly to an interchangeable eyeglass attachment used in conjunction with conventional eyeglasses in order to adjustably retain the eyeglasses on the head of the wearer. The attachment includes a clip assembly and an adjustable strap, which help mount the eyeglasses to the head of the wearer.

2. Description of the Related Art

Millions of people wear eyeglasses everyday. From reading glasses, to glasses used while viewing a computer screen, to fashionable sunglasses, it's common for wearer's to have multiple pairs of eyeglasses at any given time for use in a variety of different circumstances. These circumstances include but are not limited to the wearing of safety eyeglasses, or prescription eyeglasses worn during sports, during high exertion activities or physically demanding work environments. However, wearing eyeglass in their conventional form in many of these circumstances s jeopardizes the safety and security of the wearer. Conventional eyeglasses include temple side supports, which minimally secure the glasses behind a wearer's ears. Activities that involve physical exertion or movement of the head cause these eyeglasses to move making it difficult to see, easy to fall off and possibly break. For a construction worker, surgeon or truck driver, the ability to see cannot be compromised or life threatening safety concerns are presented. However, it is not always necessary for these workers to wear glasses that are highly secured, and the flexibility to alternate between conventional use and additional security and safety is ideal. The present invention contemplates this disadvantage with conventional eyewear and the safety and security of eyeglass use, by providing an interchangeable attachment that may adjustably secures to the head of the wearer or be worn by conventional means about the wearer's ears.

In addition, safety concerns regarding talking on the telephone while driving have become scrutinized and are the topic of much legislation. Most states now require hands-free cell phone use, meaning the use of a headset or earpiece while driving and for other purposes. For conventional eyeglass wearers this is another gadget that needs to adapt within the general vicinity of the wearer's ears. As we all know, earpieces are flimsy and difficult to maintain within the ear. The present invention overcomes these disadvantages by incorporating an earpiece holder within the eyeglass attachment.

While these units may be suitable for the particular purpose employed, or for general use, they would not be as suitable for the purposes of the present invention as disclosed hereafter.

It is, therefore, a primary object of the present invention to provide an interchangeable eyeglass attachment used in conjunction with conventional eyeglasses in order to adjustably retain the eyeglasses on the head of the wearer.

It is, therefore, a primary object of the present invention to provide an interchangeable eyeglass attachment that provides users with the flexibility to wear eyeglasses in a conventional means about their ears, or in a more permanent means adjustably secured about their head.

It is another object of the present invention to provide a simple and efficient means of interchanging between uses, using an improved clip assembly of the eyeglass attachment.

It is another object of the present invention to provide an eyeglass attachment having an integrally coupled earpiece holder allowing for safe hands-free cell phone use.

BRIEF SUMMARY OF THE INVENTION

In accordance with one aspect of the present invention, eyewear is disclosed including a pair of eyeglasses having at least one lens having an outer peripheral edge for positioning at least partially in front of a wearer's eyes. The eyeglasses include a frame for securing the eyeglasses against the wearer's face, and the frame includes a nose bridge coupled thereto for positioning against the bridge of the wearer's nose. The frame includes two spaced-apart side ear-stems pivotally connected to the outer peripheral edges of the lens and they extend along the temples of the wearer. The ear-stems include a distal end having a fixed substantially oval catch having a curved hinge that gradually tapers downwardly to an end tip.

The eyewear includes a pair of removable tips each removably connected to the corresponding distal end of the ear-stem for conventionally wearing the eyeglasses about the ears of the wearer. The tips include a hollow cavity member having a substantially rectangular downwardly facing notch having an abutment surface bordering the notch. The notch receives the corresponding catch of the ear-stem such that the end tip is engaged by the abutment surface.

The eyewear includes an interchangeable attachment means that is removably connected to the distal ends of the ear-stems for non-conventionally wearing the eyeglasses about the head of the wearer. The attachment means includes a pair of clip assemblies each including a fastener, a removably strap tip, and a pin having an outwardly facing end. The removable strap tip includes a hollow cavity member having a substantially rectangular downwardly facing notch having an abutment surface bordering the notch for connecting to the catch of the associated ear-stem. The notch of the strap tip receives the corresponding catch of the ear-stem such that the end tip is engaged by the abutment surface of the strap tip. The removable strap tip includes a circular flange having an aperture and the fastener includes an opening and a substantially circular flange having a centrally positioned aperture. When the aperture of the strap tip and the aperture of the fastener are vertically aligned, they are coupled together about the pin.

The attachment means includes an adjustable strap integrally coupled between the clip assemblies for securely mounting the eyeglasses to the head of the wearer. The strap includes a pair of elongated members each having a substantially flexible elongated rectangular portion having an inwardly facing side, a securing end and a free end. The inwardly facing side contains hook and loop fastener integrally affixed thereto. When securing end threads through the opening of the fastener of the clip assembly a rivet easily secures it to oneself.

The attachment means further includes an earpiece holder integrally coupled to the outwardly facing end of the pin and includes a substantially circular bulb having a substantially circular aperture and a channel extending to the associated aperture.

In accordance with an additional eyewear embodiment, a pair of eyeglasses including at least one lens having an outer peripheral edge is contemplated. The eyeglasses include a frame having a nose bridge and two spaced-apart side ear-stems pivotally connected to the outer peripheral edges of the lens. The ear-stems include a distal end having a fixed catch.

The eyewear includes a pair of removable tips each removably connected to the corresponding distal end of the ear-stem and includes a hollow cavity member having a substantially rectangular downwardly facing notch having an abutment surface bordering the notch.

The eyewear further includes an interchangeable attachment means having an adjustable strap means integrally coupled between a pair of clip assemblies each including a removable means for connecting with the fixed catch of the ear-stems. The fastening means connects to the adjustable strap. The pin pivots the removable means and fastening means about an axis. The attachment means includes an earpiece holding means for securing a wire of an earpiece to the attachment means.

The catch of the eyewear is substantially oval and has a curved hinge that gradually tapers downwardly to an end tip.

The notches of the removable tips of the eyewear receive the corresponding catches of the ear-stems such that the end tips are engaged by the abutment surfaces.

The removable means of the eyewear further includes a removable strap tip having a hollow cavity member having a substantially rectangular downwardly facing notch having an abutment surface bordering the notch for connecting to the catch of the associated ear-stem. When the notch of the strap tip receives the corresponding catch of the ear-stem the end tip is securely engaged by the abutment surface of the strap tip.

The removable strap tip of the eyewear includes a circular flange having an aperture and the fastener includes an opening and a substantially circular flange having a centrally positioned aperture. When the aperture of the strap tip and the aperture of the fastener are vertically aligned, the pin couples them together.

The adjustable strap means of the eyewear includes a pair of elongated members each including a substantially flexible elongated rectangular portion having an inwardly facing side, a securing end and a free end. The inwardly facing side contains hook and loop fastener integrally affixed thereto.

The securing ends of the elongated members of the adjustable straps of the eyewear thread through the openings of the fastener of the clip assembly and secure to the securing ends by a rivet.

The earpiece holding means of the eyewear is integrally coupled to the outwardly facing end of the pin and includes a substantially circular bulb having a substantially circular aperture and a channel extending to the associated aperture.

In accordance with an additional embodiment, an interchangeable eyewear attachment is presented for use with eyeglasses having a pair of ear-stems. The attachment includes an adjustable strap means integrally coupled between a pair of clip assemblies each including a removable means for connecting with the ear-stems. The attachment further includes a fastening means for connecting to the adjustable strap, and a pin for pivoting the removable means and fastening means about an axis. The pin includes an earpiece holding means for securing a wire of an earpiece to the attachment means.

In accordance with an additional embodiment of the present invention, a method of wearing the eyewear is presented such that a wearer may alternate between conventional wear about a wearer's ears and non-conventional wear about a wearer's head. The eyewear has integrated earpiece capabilities. The method includes releasing the removable tips from the ear-stems by depressing the end tips of the catches within the hollow cavity members and pulling the hollow cavity members away from the ear-stems in a substantially parallel direction. Next a wearer connects the removable strap tips of the attachment means to each of the corresponding catches of the ear-stems by extending the catch within the hollow cavity member parallel to the extension of the ear-stems. After which, a wearer installs at least one earpiece wire within the earpiece holder by depressing the wire of the earpiece through the channel until the wire is secured within the circular aperture. Next, the wearer releases the removable strap tips from the ear-stem by depressing the tips of the catches within the hollow cavity members and pulling the hollow cavity members away from the ear-stems in a substantially parallel direction. Lastly, the wearer re-connects the removable tips to the catches of the ear-stems by extending the catches within the hollow cavity members parallel to the extensions of the ear-stems.

BRIEF DESCRIPTION OF THE SEVERAL VIEWS OF THE DRAWINGS

To these and to such other objects that may hereinafter appear, the present invention related to eyewear having interchangeable eyeglass attachment as described in detail in the following specification and recited in the annexed claims, taken together with the accompanying drawings, in which like numerals refer to like parts in which:

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

DETAILED DESCRIPTION OF THE INVENTION

Figure 7:
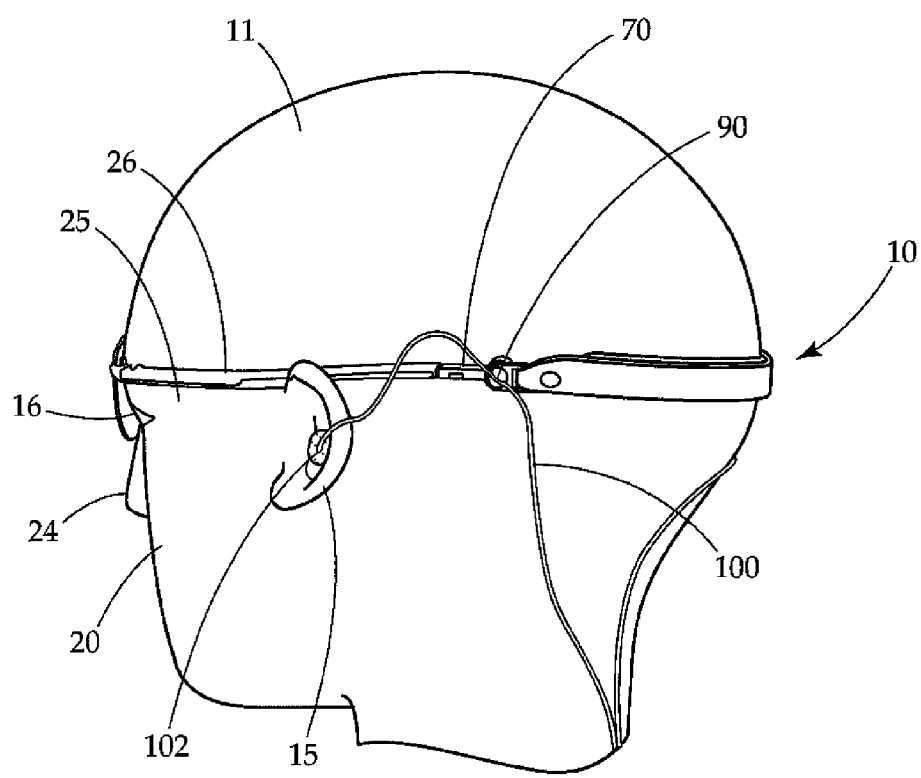
FIG. 7 is a diagrammatic perspective view of a person wearing eyeglasses having the interchangeable eyeglass attachment of FIG. 3A secured about their head.

The present invention is directed to an eyeglass attachment 10 used in conjunction with a variety of different pairs of eyeglasses and sunglasses in order to adjustable retain the eyeglasses on the head of the wearer. In its broadest context, illustrated in FIG. 7, the attachment means 10 includes an adjustable strap 70 and a pair of clip assemblies 60 having at least one earpiece holder, which help mount the eyeglasses 12 to the head 11 of the wearer.

Figure 1:
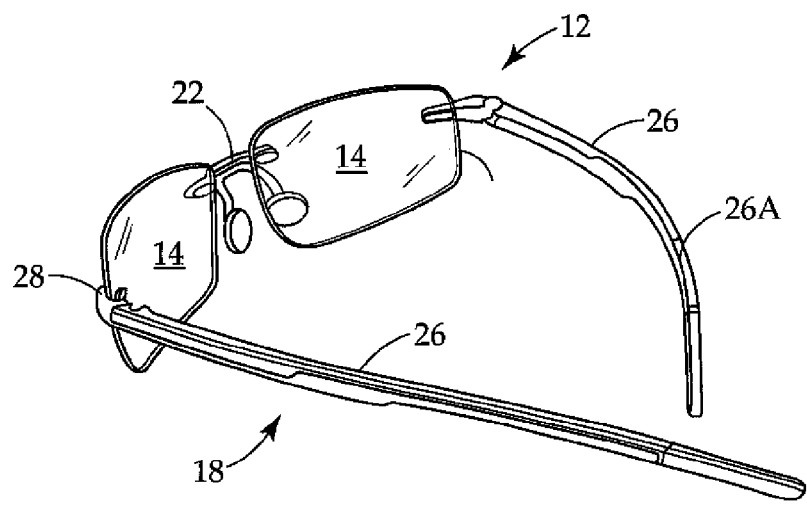
FIG. 1 is an isometric view of conventional eyeglasses adapted for use with the interchangeable eyeglass attachment of the present invention having side ear-stems having removable end tips.

In accordance with the preferred embodiment, FIG. 1 illustrates eyeglasses 12 including at least one lens 14, having an outer peripheral edge 14A, for positioning at least partially in front of a wearer's eyes 16, and a frame 18 for securing the eyeglasses against the wearer's face 20. The frame 18 of the illustrated embodiment includes a nose bridge 22 coupled to the frame 18 for positioning on the bridge of the wearer's nose 24, and two spaced-apart side ear-stems 26 connected to the outer peripheral edges 14B of the lens 14 by a pivotal hinged mount 28. The ear-stems 26 extend along the temples 25 of the wearer. As shown in FIG. 2B, the ear-stems 26 include a distal end 26A having a fixed catch 32.

The eyeglasses 12 as disclosed herein are for illustrative purposes only and alternate eyeglasses and eyewear, including but not limited to sunglasses, monolithic lenses, bifocals, and frameless glasses are contemplated for use with the present attachment 10.

Figure 2A:
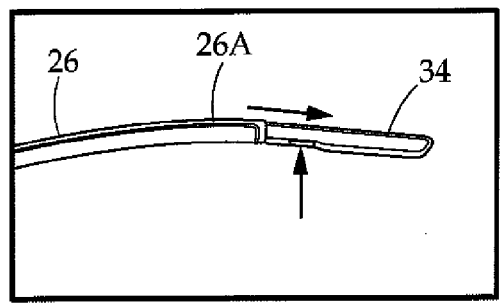
FIG. 2A is an exploded view of the side ear-stem showing the actuation of removal of the removable tip from the ear-stems of FIG. 1.
Figure 2B:
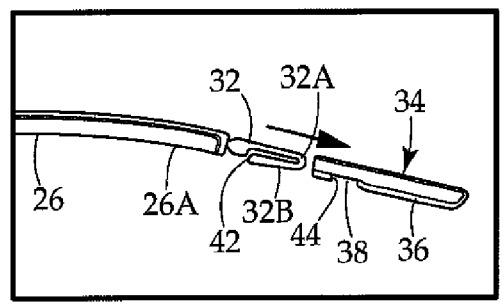
FIG. 2B is an exploded view of the side ear-stem wherein the removable tip is detached from the ear-stem of FIG. 1.

As illustrated in FIGS. 2A and 2B, the eyeglasses 12 include a pair of removable tips 34 removably connected to the distal ends 26A of the ear-stems 26. The removable tips 34 complete the distal ends 26A of the ear-stems 26 while in conventional use, such that the eyeglasses 12 can be worn normally about the ears 15 of the wearer.

As best illustrated in FIGS. 2A and 2B, a user can remove the tips 34 and interchange them with the adjustable strap 50 of the attachment 10 as desired and discussed in further detail infra. The removable tips 34 include a hollow cavity member 36 having a substantially rectangular downwardly facing notch 38. The distal ends 26A of the ear-stems 26 include the catch 32 adapted to be received within the notch 38 of the removable tip 34 when the catch 32 is extended within the hollow cavity member 36 generally parallel to the extension of the ear-stems 26 as illustrated by arrow 37. The catch 32 is substantially oval shaped and includes a curved hinge 32A that gradually tapers downwardly 32B to an end tip 42. Once received within the notch 38, the catch 32 is substantially prevented from moving and thus the ear-stem 26 is substantially fixed within the removable tip 34.

As best illustrated in FIG. 2B, the hollow cavity member 36 provides an abutment surface 44 bordering the notch 38 that is engaged by the end tip 42 of the catch 32. To release the removable tip 34 from the ear-stem 26, a user gently depresses the end tip 42 of the catch 32 within the hollow cavity member 36 and gently pulls the hollow cavity member 36 away from the ear-stem 26 in a substantially parallel direction as depicted by arrow 37.

The catch 32 provides for removal and interchangeability from the removable tip 34 to the removably strap tip of the adjustable strap 50, such that a wearer has the flexibility to wear the eyeglasses 12 secured semi-permanently about their ears 15 when utilizing the removable tips 34 or more permanently about their head 11 when utilizing the adjustable strap 50.

Figure 3A:
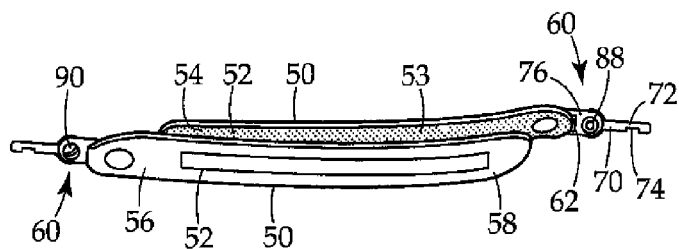
FIG. 3A is a top elevational view of the adjustable strap, clip assemblies and earpiece holder of the interchangeable eyeglass attachment of the present invention.

The attachment 10 is best shown in FIG. 3A and includes a pair of clip assemblies 60 having earpiece holders 90 and an adjustable strap 50 connected therebeteen for securely mounting the eyeglasses 12 to the head 11 of the wearer. The adjustable strap 50 includes a pair of elongated members 52 adapted to adjustably attach to one another by a hook and loop fastener 53. Each member 52 includes a substantially elongated rectangular portion of flexible fabric having an inwardly facing side 54, a securing end 56 and a free end 58. The inwardly facing sides 54 contain hook and loop fastener 53 integrally affixed thereto. The securing ends 56 each thread through an opening 62 within the fastener 76 of one of the clip assemblies 60, and are secured unto oneself near the securing end 56 by a rivet 64.

Each clip assembly 60 has three members including the fastener 76, a removably strap tip 70, and a pin 82. The removable strap tip 70 connects the adjustable strap 50 to the catch 32 of the associated ear-stem 26. The removable strap tip 70 is integrated within each clip assembly 60 and is substantially similar in configuration to the removable tips 34.

The removable strap tip 70 includes a hollow cavity member 72 having a substantially rectangular downwardly facing notch 74. The catch 32 of the distal ends 26A of the ear-stems 26 receive the notch 74 of the removable strap tip 70 when the catch 32 is extended within the hollow cavity member 72 generally parallel to the extension of the ear-stems 26 as illustrated by arrow 71 in FIG. 3B. Once received within the notch 74, the catch 32 is substantially prevented from moving and thus the ear-stem 26 is substantially fixed within the removable strap tip 70.

Figure 3B:
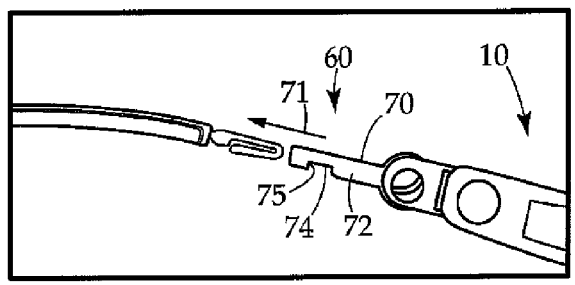
FIG. 3B is an isometric exploded view of the clip assembly of the interchangeable eyeglass attachment of FIG. 3A connecting with the catch at the distal end of the ear-stem.

As best illustrated in FIG. 3B, the hollow cavity member 72 of the strap tip 70 provides an abutment surface 75 bordering the notch 74 that is engaged by the end tip 42 of the catch 32. To release the removable strap tip 70 from the ear-stem 26, a user gently depresses the tip 34 of the catch 32 within the hollow cavity member 72 and gently pulls the hollow cavity member 72 away from the ear-stem 26 in a substantially parallel direction opposite the direction of arrow 71.

Figure 4:
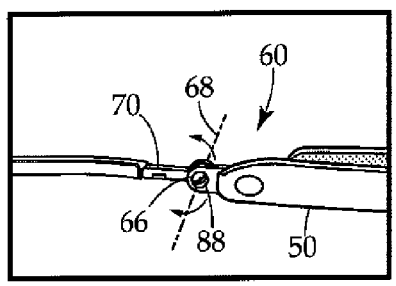
FIG. 4 is an isometric exploded view of the clip assembly of the interchangeable eyeglass attachment of FIG. 3A showing the pivot and pivot axis of the assembly.

As best illustrated in FIG. 4, the clip assembly 60 includes a pivot 66 or hinge providing a pivot axis 68. Each pivot 66 includes the removable strap tip 70 providing part of the hinge and including a circular flange 80 having an aperture 82. The fastener 76 provides the other part of the hinge and includes a substantially circular flange 84 having a centrally positioned aperture 86 and the flange extending outwardly to the opening 62. The aperture 82 of the strap tip 70 and the aperture 86 of the fastener 76 are vertically aligned and coupled together by the pin 88. The adjustable strap 50 pivots about the axis 68 to achieve optimum mounting and comfort about a wearer's head.

Figure 5:
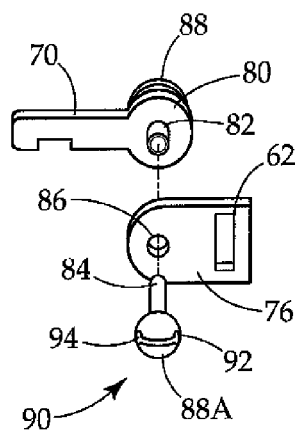
FIG. 5 is an isometric exploded view of the pin of the clip assembly of the interchangeable eyeglass attachment of FIG. 3A shown integrally coupled to the earpiece holder.

As illustrated in FIG. 5, the pin 88 is preferably made of a flexible plastic material and includes an outwardly facing end 88A having an earpiece holder 90. The earpiece holder 90 is a substantially circular bulb having a substantially circular aperture 92 and a channel 94 extending to the associated aperture 92.

Figure 6:
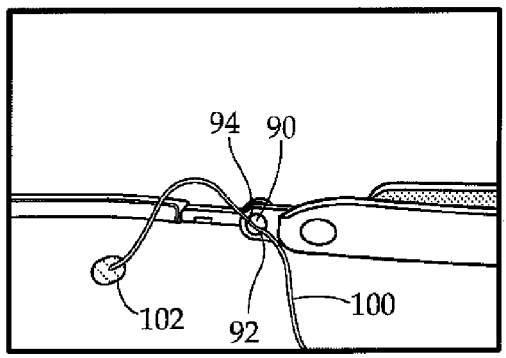
FIG. 6 is an isometric exploded view of the interchangeable eyeglass attachment of FIG. 3A showing the earpiece holder retaining a wire of an earpiece.

As best illustrated in FIG. 6, a wearer depresses the wire 100 of an earpiece 102 through the channel 94 until the wire is secured within circular aperture 92. The earpiece holder 90 provides the eyeglass wearer with the ability to listen to music or talk on the telephone in a hands free manner without interference with their eyeglasses.

In conclusion, herein is presented eyewear having an interchangeable eyeglass attachment. The invention is illustrated by example in the drawing figures, and throughout the written description. It should be understood that numerous variations are possible, while adhering to the inventive concept. Such variations are contemplated as being a part of the present invention. While only a limited number of preferred embodiments of the present invention have been disclosed for purposes of illustration, it is obvious that many modifications and variations could be made thereto. It is intended to cover all of those modifications and variations, which fall within the scope of the present invention as defined by the following claims.

I claim:
1. Eyewear comprising:
a pair of eyeglasses including at least one lens having an outer peripheral edge for positioning at least partially in front of a wearer's eyes, and a frame for securing said eyeglasses against the wearer's face, wherein said frame including a nose bridge coupled thereto for positioning against the bridge of the wearer's nose, and two spaced-apart side ear-stems pivotally connected to said outer peripheral edges of said lens and extending along the temples of the wearer, wherein said ear-stems include a distal end having a fixed substantially oval catch having a curved hinge that gradually tapers downwardly to an end tip;

a pair of removable tips each removably connected to said corresponding distal end of said ear-stem for conventionally wearing said eyeglasses about the ears of the wearer, said tips including a hollow cavity member having a substantially rectangular downwardly facing notch having an abutment surface bordering said notch, wherein said notch receives said corresponding catch of said ear-stem such that said end tip is engaged by said abutment surface; and an interchangeable attachment means removably connected to said distal ends of said ear-stem for non-conventionally wearing said eyeglasses about the head of the wearer, comprising:

a pair of clip assemblies each including a fastener, a removably strap tip, and a pin having an outwardly facing end, wherein said removable strap tip including a hollow cavity member having a substantially rectangular downwardly facing notch having an abutment surface bordering said notch for connecting to said catch of said associated ear-stem, wherein said notch of said strap tip receives said corresponding catch of said ear-stem such that said end tip is engaged by said abutment surface of said strap tip, wherein said removable strap tip including a circular flange having an aperture and said fastener including an opening and a substantially circular flange having a centrally positioned aperture wherein said aperture of said strap tip and said aperture of said fastener are vertically aligned and coupled together about said pin;

an adjustable strap integrally coupled between said clip assemblies for securely mounting said eyeglasses to the head of the wearer, including a pair of elongated members each said member including a substantially flexible elongated rectangular portion having an inwardly facing side, a securing end and a free end, wherein said inwardly facing side contains hook and loop fastener integrally affixed thereto, wherein said securing end threads through said opening of said fastener of said clip assembly and secures to said securing end by a rivet; and an earpiece holder integrally coupled to said outwardly facing end of said pin and including a substantially circular bulb having a substantially circular aperture and a channel extending to said associated aperture.

2. A method of wearing the eyewear of claim 1 and alternating between conventional wear about a wearer's ears and non-conventional wear about a wearer's head and having integrated earpiece capabilities, using the eyewear of claim 1, the steps comprising:

a. releasing the removable tips from the ear-stems by depressing the end tips of the catches within the hollow cavity members and pulling the hollow cavity members away from the ear-stems in a substantially parallel direction;

b. connecting the removable strap tips of the attachment means to each of the corresponding catches of the ear-stems by extending said catch within said hollow cavity member parallel to said extension of the ear-stems;

c. installing at least one earpiece wire within said earpiece holder by depressing the wire of the earpiece through the channel until the wire is secured within the circular aperture;

d. releasing the removable strap tips from the ear-stem by depressing the tips of the catches within the hollow cavity members and pulling the hollow cavity members away from the ear-stems in a substantially parallel direction; and e. re-connecting the removable tips to the catches of the ear-stems by extending said catches within said hollow cavity members parallel to said extensions of the ear-stems.

3. Eyewear comprising:

a pair of eyeglasses including at least one lens having an outer peripheral edge, and a frame including a nose bridge and two spaced-apart side ear-stems pivotally connected to said outer peripheral edges of said lens, wherein said ear-stems include a distal end having a fixed catch;

a pair of removable tips each removably connected to said corresponding distal end of said ear-stem including a hollow cavity member having a substantially rectangular downwardly facing notch having an abutment surface bordering said notch; and an interchangeable attachment means including an adjustable strap means integrally coupled between a pair of clip assemblies each including a removable means for connecting with said fixed catch of said ear-stems, a fastening means for connecting to said adjustable strap, and a pin for pivoting said removable means and fastening means about an axis, said attachment means including an earpiece holding means for securing a wire of an earpiece to said attachment means.

4. The eyewear of claim 3, wherein the catch is substantially oval and has a curved hinge that gradually tapers downwardly to an end tip.

5. The eyewear of claim 4, wherein the notches of the removable tips receive the corresponding catches of the ear-stems such that the end tips are engaged by the abutment surfaces.

6. The eyewear of claim 4, wherein the removable means further comprise a removable strap tip having a hollow cavity member having a substantially rectangular downwardly facing notch having an abutment surface bordering the notch for connecting to the catch of said associated ear-stem, wherein the notch of the strap tip receives the corresponding catch of the ear-stem such that the end tip is engaged by the abutment surface of the strap tip.

7. The eyewear of claim 6, wherein the removable strap tip includes a circular flange having an aperture and the fastener includes an opening and a substantially circular flange having a centrally positioned aperture wherein the aperture of the strap tip and the aperture of the fastener are vertically aligned and coupled together about the pin.

8. The eyewear of claim 7, wherein the adjustable strap means includes a pair of elongated members each including a substantially flexible elongated rectangular portion having an inwardly facing side, a securing end and a free end, wherein the inwardly facing side contains hook and loop fastener integrally affixed thereto.

9. The eyewear of claim 8, wherein the securing ends of the elongated members of the adjustable straps thread through the openings of the fastener of the clip assembly and secure to the securing ends by a rivet.

10. The eyewear of claim 9, wherein the earpiece holding means is integrally coupled to the outwardly facing end of the pin and includes a substantially circular bulb having a substantially circular aperture and a channel extending to said associated aperture.

11. An interchangeable eyewear attachment for use with eyeglasses having a pair of ear-stems, comprising:

an adjustable strap means integrally coupled between a pair of clip assemblies each including a removable means for connecting with said ear-stems, a fastening means for connecting to said adjustable strap, and a pin for pivoting said removable means and fastening means about an axis, said pin including an earpiece holding means for securing a wire of an earpiece to said attachment means.

* * * * *